United States Patent [19]

Hashimoto et al.

[11] 4,079,389
[45] Mar. 14, 1978

[54] DAYTIME STROBO APPARATUS FOR CAMERAS WITH ELECTRIC SHUTTERS

[75] Inventors: Akihiko Hashimoto; Isao Kondo, both of Hachioji, Japan

[73] Assignee: Olympus Optical Company, Ltd., Tokyo, Japan

[21] Appl. No.: 709,810

[22] Filed: Jul. 29, 1976

[30] Foreign Application Priority Data

Aug. 25, 1975 Japan ................................ 50-102682

[51] Int. Cl.² .......................... G03B 7/16; G03B 15/03
[52] U.S. Cl. .................................... 354/33; 354/60 F; 354/137; 354/139; 354/149
[58] Field of Search ........................ 354/27, 32, 33, 34, 354/60 F, 51, 127, 128, 129, 137, 139, 145, 149, 138; 315/241 P, 241 R

[56] References Cited

U.S. PATENT DOCUMENTS

| | | | |
|---|---|---|---|
| 3,690,237 | 9/1972 | Fuwa | 354/145 X |
| 3,978,496 | 8/1976 | Matsumoto | 354/33 |
| 3,994,001 | 11/1976 | Maitani et al. | 354/51 |
| 4,005,444 | 1/1977 | Uchiyama et al. | 354/27 |

*Primary Examiner*—L. T. Hix
*Assistant Examiner*—William B. Perkey
*Attorney, Agent, or Firm*—Ostrolenk, Faber, Gerb & Soffen

[57] ABSTRACT

A daytime strobo apparatus is provided for a camera which includes an electric shutter, and a control circuit which controls the operation of the electric shutter in accordance with the amount of light incident on a photoelectric transducer element and which is operatively associated with or internally houses a strobo unit. The strobo apparatus comprises a strobo decision circuit in the control circuit which is responsive to the photoelectric transducer element, a decision level adjusting circuit for adjusting an input level from the transducer element to the decision circuit, an X-contact drive circuit responsive to the decision circuit, and the above strobo unit. The apparatus is operative to energize the strobo unit at a timing subsequent to the initiation of operation of the electric shutter which is determined by the operation of the various circuits.

7 Claims, 5 Drawing Figures

DAYTIME STROBO APPARATUS FOR CAMERAS WITH ELECTRIC SHUTTERS

BACKGROUND OF THE INVENTION

The invention relates to a daytime strobo apparatus for cameras with electric shutters.

When taking pictures in daytime or in a location having a comparable illumination (this being generally included by the term "daytime"), it is often necessary to utilize a strobo unit to provide a supplementary supply of light to shaded portions of the object being photographed. In such applications, the film will be improperly exposed unless the amount of light from the strobo unit is properly proportioned relative to the intensity of natural light. However, the determination of such proportion requires a considerable level of skill in a diaphragm adjusting procedure once an exposure value has been determined, particularly with an electric shutter in which an exposure period is automatically determined.

SUMMARY OF THE INVENTION

In view of the foregoing, it is an object of the invention to provide a daytime strobo apparatus for cameras with electric shutters which eliminates the above difficulty by providing a decision circuit in the shutter control circuit of the camera which is responsive to an adjusted input level separately from a similar decision circuit contained in the shutter control circuit for determining the amount of incident natural light, the strobo decision circuit being operatively associated with an X-contact drive circuit to energize a strobo unit at an optimum timing which achieves a necessary proportion between the amount of natural light and that supplied by the strobo unit, thereby enabling a beginner to take a picture in daytime in a facilitated manner.

DETAILED DESCRIPTION OF PREFERRED EMBODIMENT

Figure 1:
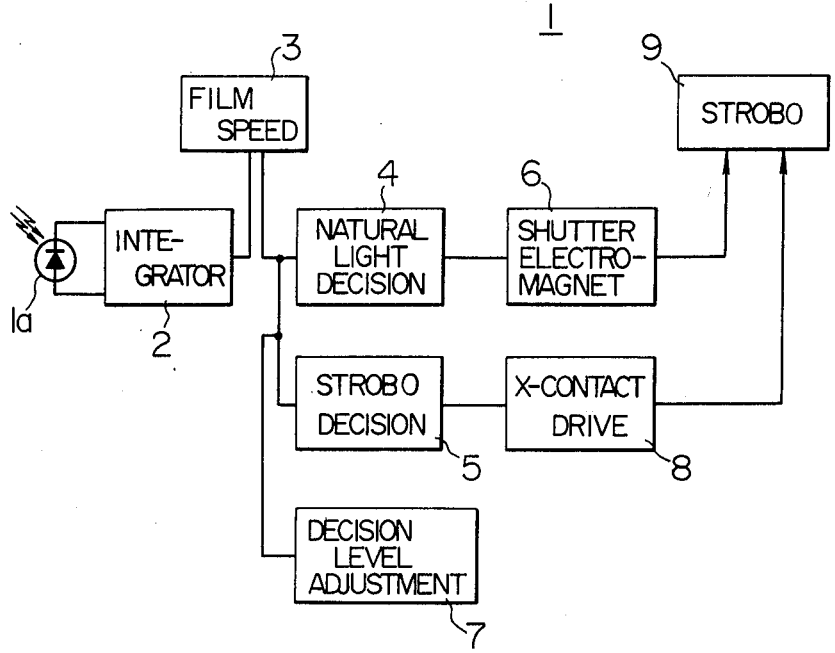
FIG. 1 is a block diagram of a shutter control circuit constructed in accordance with the invention.

Referring to FIG. 1, there is shown a block diagram of a shutter control circuit 1. The circuit includes a photoelectric transducer element 1a which is connected across a pair of input terminals of an integrator 2. The output terminal of the integrator 2 is connected through a film speed presetting device 3 to a natural light decision circuit 4 and a strobo decision circuit 5. The integrator 2 is activated for photometry as an X-contact is closed, upon shutter release, to feed its output signal in common to the circuits 4 and 5. At this time, a strobo unit 9 is not yet energized. The natural light decision circuit 4 is connected with a shutter electromagnet circuit 6, and cooperates therewith to energize an electromagnet (not shown) which serves to maintain a shutter in its open condition for a required exposure period. The strobo decision circuit is constructed to produce an output signal with a time delay which corresponds to a level adjustment made by a level adjusting circuit 7. The circuit 5 is connected with an X-contact drive circuit 8, which is actuated by an output of the circuit 5 and whose timing is determined by the time delay subsequent to the shutter release, thereby producing an illumination initiation signal supplied to the strobo unit 9. The level adjustment in the circuit 5 is made such that said timing achieves an exposure period for the strobo unit which is from 20 to 90% of the entire exposure period. In response to the incident light on the transducer element 1a, the natural light decision circuit 4 deactuates the shutter electromagnet circuit 6 when a sufficient amount of exposure has been provided, the circuit 6 closing the shutter and applying an illumination stop signal to the strobo unit 9.

Figure 2:
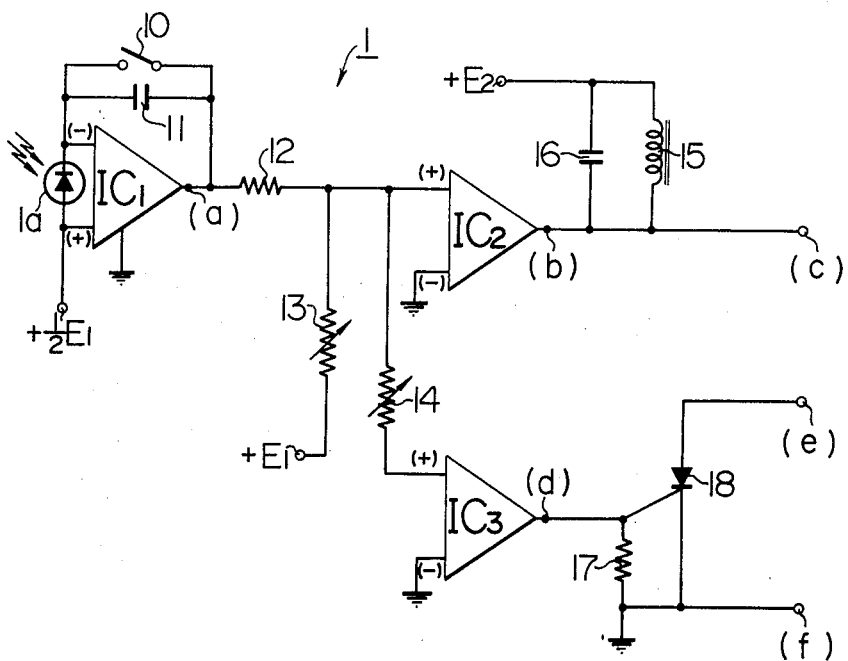
FIG. 2 is a circuit diagram of the shutter control circuit.

FIG. 2 shows a specific circuit arrangement for the shutter control circuit of the invention. The transducer element 1a comprises a photovoltaic element such as silicon blue cell, for example. The integrator 2 comprises an operational amplifier IC1 having a non-inverting input terminal designated by (+) and an inverting input terminal designated by (−), across which the transducer element 1a is connected. A trigger switch 10 and a time constant capacitor 11 is connected in shunt across the inverting input terminal (−) and the output terminal a. The output terminal a is connected through a fixed resistor 12 with a variable resistor 13 which constitutes the adjustable film speed presetting device 3, and is also connected with another variable resistor 14 which constitutes the decision level adjusting circuit 7. The output terminal a is also connected with the non-inverting input terminal (+) of a differential amplifier IC2 which constitutes the natural light decision circuit 4. The output terminal b of the natural light decision circuit 4 is connected with one end of an open shutter retaining electromagnetic 15 shunted by a capacitor 16, which together constitute the shutter electromagnet 6, and also with a terminal c which transmits an illumination instruction signal to the strobo unit. The other end of the variable resistor 14 is connected with a non-inverting input terminal (+) of a differential amplifier IC3 which constitutes the strobo decision circuit 5. While not shown, the differential amplifier IC3 incorporates a circuit element such as capacitor or resistor which, together with the variable resistor 14 constitutes a delay circuit of a known form, and also a switching semiconductor element. The differential amplifier IC3 has an output terminal d which is connected with a fixed resistor 17 and with the gate terminal of a silicon controlled rectifier element 18 which constitutes the X-contact drive circuit 8. The element 18 has its anode terminal connected with a terminal e at which an instruction signal for initiation of illumination by the strobo unit is produced, and has its cathode terminal connected with ground, as is the opposite end of the fixed resistor 17. An earth terminal f for the strobo unit is also connected with ground. It will be understood that the terminals c, e and f are connected through an X-contact (not shown) to the strobo unit 9 (see FIG. 3) which may be of a well known discharge tube type.

Figure 3:
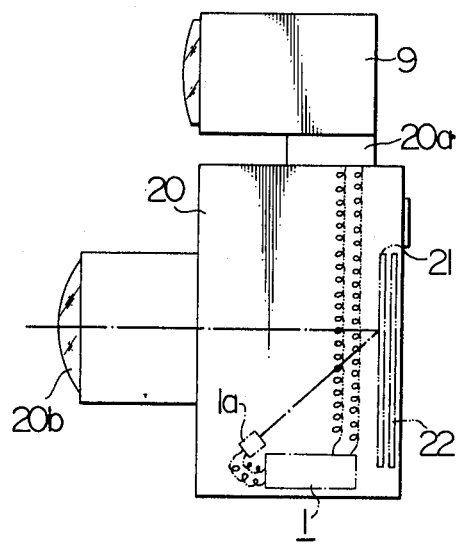
FIG. 3 is a schematic diagram illustrating the relationship between a camera, a strobo unit and a shutter control circuit.

The strobo unit 9 may be a conventional type unit, and an example thereof is shown in FIG. 3 wherein it includes a hot shoe 20a which is utilized when mounting the unit on top of a camera 20 so as to be electrically connected with the shutter control circuit 1 including the photoelectric transducer element 1a, which circuit is disposed within the camera 20. The transducer element 1a is adapted to receive a portion of the light reflected from shutter 21 or film 22, which light passes through a taking lens 20b of the camera 20.

Figure 4:
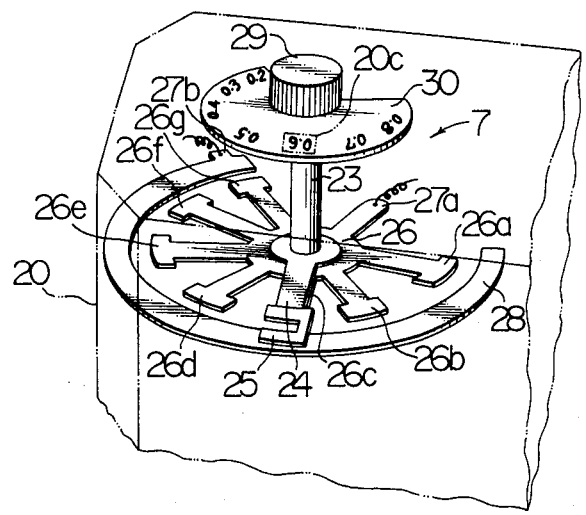
FIG. 4 is a perspective view of a variable resistor which is used for adjusting a decision level.

As shown in FIG. 4, the decision level adjusting circuit 7 comprises an arcuate resistor body 28. Describing its construction more specifically, there is provided a rotatable shaft 23, to the lower end of which is secured an arm 24 of an insulating material and carrying a sliding conductive shoe 25 on its free end. A conductive member 26 having a plurality of contacts 26a, 26b ... 26g which are disposed in concentric manner about the shaft 23 is connected with an electrical terminal 27a, and one end of the resistor 28 is connected with another electrical terminal 27b. The described assembly is housed within the camera 20, and the shaft 23 partly projects externally of the camera where it has a knob 29 fixedly mounted thereon. By turning the knob 29, the arm 24 is angularly moved to bring successive contacts 26a to 26f into electrical contact with the resistor 28 through the shoe 25. Thus, as the knob is turned, the resistance between terminals 27a and 27b is varied, thus adjusting the level at which the differential amplifier IC3, which constitutes the strobo decision circuit 5, operates. A dial 30 which indicates the proportion of the light output from the strobo unit to the total amount of exposure is secured to the top of the shaft 23 so as to be visually exposed through a window 20c, shown in phantom lines, and formed in the top portion of the housing of camera 20. Preferably, the proportion ranges from 0.2 to 0.9. Alternatively, the external provision of the knob 29 may be avoided by employing a special arrangement such that the shaft 23 may be turned by a tool as desired, thus utilizing semi-fixed resistors in place of the variable resistor 14. It will be also appreciated that the variable resistor 14 can be adjusted by any known suitable means.

The shutter control circuit 1 shown in FIG. 2 operates as follows: When a shutter 21 of the camera 20 (see FIG. 3) is released, the trigger switch 10 is closed, thereby energizing the electromagnet 15 to maintain the shutter 21 open. Subsequently, the trigger switch 10 is opened, whereby the transducer element 1a, operational amplifier IC1 and capacitor 11 become effective to produce an output which operates the differential amplifier IC3 having its level adjusted by means of the variable resistor 14, thereby rendering SCR 18 conductive at a preset timing to energize the strobo unit 9 (see FIG. 3) for illumination. The X-contact in the strobo unit 9 is mechanically closed prior to the conduction of SCR 18 by being interlocked with the shutter release, for example. When a sufficient amount of exposure has been given, the operation of the differential amplifier IC2 is reversed to deenergize the electromagnet 15, thus closing the shutter 21 and simultaneously stopping the illumination by the strobo unit 9.

Figure 5:
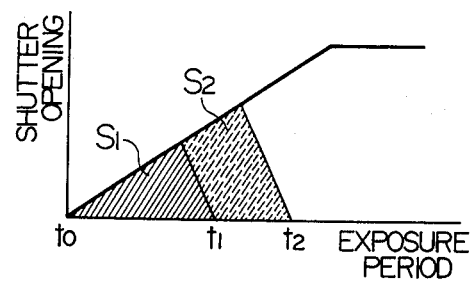
FIG. 5 is a graphic illustration of the relationship between natural light and illumination supplied by the strobo unit in the total exposure.

FIG. 5 graphically shows a relationship of an exposure $S_2$ (area hatched by broken lines) and an exposure $S_1$ by natural light (the sum of areas hatched by broken and solid lines). In the illustrated instance, $S_2 = 0.6 S_1$. In this instance, the shutter is released at time $t_0$, the illumination by the strobo unit is initiated at time $t_1$, and the entire exposure period is terminated (i.e. the shutter is closed) at time $t_2$.

What is claimed is:

1. The combination of a camera and associated daytime strobo apparatus, comprising:
   a shutter assembly;
   a photoelectric transducer element and photometric integrator for generating an output signal representative of the amount of light entering said camera during an exposure period of said camera;
   a first electronic control circuit responsive to said output signal for controlling the operation of said shutter assembly, said electronic control circuit to cause said shutter assembly to expose film in said camera for an exposure period whose length varies as a function of said output signal;
   a presettable decision level adjusting circuit for determining the portion of said exposure period during which said strobo apparatus is to be enabled;
   a second electronic control circuit responsive to said output signal and said presettable decision level adjusting circuit for controlling the operation of said strobo apparatus, said second electronic control circuit to enable said strobo apparatus during the portion of said exposure period determined by said presettable level adjusting decision circuit.

2. The combination of claim 1 wherein the instant at which said strobo apparatus is enabled by said second electronic circuit varies as a function of the amount of light received by said transducer element and the setting of said presettable decision level circuit.

3. The combination of claim 2 wherein said first electronic circuit comprises:
   an electromagnet for controlling the operation of said shutter assembly; and
   an operational amplifier responsive to said output signal for controlling the operation of said electromagnet.

4. The combination of claim 2 wherein said second electronic control circuit comprises:
   an X-contact drive circuit for activating said strobo apparatus responsive to a firing signal; and
   an operational amplifier responsive to said output signal for generating said firing signal at a time instant determined by said output signal and the setting of said presettable decision level adjusting circuit.

5. The combination of claim 4 wherein said X-contact drive circuit comprises a silicon controlled rectifier element having a control input coupled to the output of said operational amplifier.

6. The combination of claim 4 wherein said decision level adjusting circuit is a variable resistor which cooperates with said operational amplifier to determine the level said output signal must reach before said operational amplifier generates said firing signal.

7. The apparatus of claim 2 wherein said presettable decision level adjusting circuit may be set to cause said second electronic control circuit to enable said strobo apparatus for any period between 20% and 90% of the total said exposure period.

* * * * *